US008626825B2

(12) United States Patent
Subramanian et al.

(10) Patent No.: US 8,626,825 B2
(45) Date of Patent: Jan. 7, 2014

(54) FACILITATING A SERVICE APPLICATION TO OPERATE WITH DIFFERENT SERVICE FRAMEWORKS IN APPLICATION SERVERS

(75) Inventors: Velmurugan Subramanian, Kudankulam (IN); Suresh Srinivasan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 979 days.

(21) Appl. No.: 12/717,946

(22) Filed: Mar. 4, 2010

(65) Prior Publication Data

US 2011/0060790 A1 Mar. 10, 2011

Related U.S. Application Data

(60) Provisional application No. 61/240,242, filed on Sep. 7, 2009.

(51) Int. Cl.
*G06F 15/16* (2006.01)

(52) U.S. Cl.
USPC ............................ 709/203; 709/219; 709/246

(58) Field of Classification Search
None
See application file for complete search history.

(56) References Cited

U.S. PATENT DOCUMENTS

| | | | | |
|---|---|---|---|---|
| 5,875,331 | A | 2/1999 | Lindsey | |
| 5,978,581 | A | 11/1999 | Sadiq et al. | |
| 6,549,949 | B1 * | 4/2003 | Bowman-Amuah | 709/236 |
| 6,640,238 | B1 * | 10/2003 | Bowman-Amuah | 709/201 |
| 7,210,121 | B2 * | 4/2007 | Xia et al. | 717/106 |
| 7,272,824 | B2 | 9/2007 | Black-Ziegelbein et al. | |
| 7,380,003 | B1 | 5/2008 | Guo et al. | |
| 7,607,137 | B2 * | 10/2009 | Hauser et al. | 719/318 |
| 2003/0163585 | A1 * | 8/2003 | Elderon et al. | 709/246 |
| 2004/0111464 | A1 * | 6/2004 | Ho et al. | 709/203 |
| 2004/0167915 | A1 | 8/2004 | Sundararajan et al. | |
| 2005/0144598 | A1 | 6/2005 | Sabadell et al. | |
| 2006/0143597 | A1 | 6/2006 | Alaluf et al. | |
| 2006/0262915 | A1 * | 11/2006 | Marascio et al. | 379/201.01 |
| 2008/0155500 | A1 | 6/2008 | Richmond | |
| 2009/0037896 | A1 | 2/2009 | Grechanik et al. | |

OTHER PUBLICATIONS

"Yang-Seung Jeon et. al.", "PSM Approach to Web Service Composition", The Fourth IEEE Workshop on Software Technologies for Future Embedded and Ubiquitous Systems, Publication Date: Apr. 27-28, 2006, pp. 1-9.
"Cedric Chabanois", "Transmorph Project Wiki", http://transmorph.sourceforge.net/wiki/index.php/Main_Page, Publication Date: Jan. 15, 2010, pp. 1-2.
"Oracle Corporation", "Upgrading Workshop Applications, (Part of "BEA, Weblogic Workshoptm Help (Online)")", http://edocs.bea.com/workshop/docs81/doc/en/core/index.html, Downloaded Circa: Aug. 10, 2009, pp. 1-7.

(Continued)

*Primary Examiner* — John B. Walsh
(74) *Attorney, Agent, or Firm* — Narendra Reddy Thappeta

(57) ABSTRACT

An aspect of the present invention facilitates a service application to operate with different frameworks executing in application servers. In one embodiment, the different interfaces according to which the different frameworks are designed to operate with service application are identified, including the interface implemented by the service application. Wrapper modules are then generated based on the differences between the identified interfaces and the interface implemented by the service application. The generated wrapper modules are then deployed along with the service application to facilitate the service application to operate with different frameworks.

19 Claims, 16 Drawing Sheets

(56) References Cited

OTHER PUBLICATIONS

"Oracle Corporation", "Web Service Assembler", Oracle® Application Server Web Services Developer'S Guide, Updated Date: Sep. 2006, pp. 18-1-18-90.
"Ben Van Eyle", "Web Services—A Business Perspective on Platform Choice", http://www.theserverside.com/news/1365388/Web-Services-A-Business-Perspective-on-Platform-Choice, Publication Date: Aug. 1, 2001, pp. 1-13.
"Chad Vawter and Ed Roman", "J2EE vs. Microsoft.Net: A Comparison of Building XML-Based Web Services", http://www.theserverside.com/news/1365389/J2EE-vs-MicrosoftNET-A-comparison-of-building-XML-based-web-services, Publication Date: Jun. 1, 2001, pp. 1-11.
"John Stearns et. al.", "An Introduction to the Java EE 5 Platform", http://java.sun.com/developer/technicalArticles/J2EE/intro_ee5/, Publication Date: May 2006, pp. 1-9.
"BEA Systems, Inc.", "BEA Weblogic Portal—Migration Guide", Publication Date: Mar. 2006, pp. 1-91.
"Sourceforge.Net", "Dozer", http://dozer.sourceforge.net/, Downloaded Circa: Jan. 28, 2010, pp. 1-4.
"Franz Garsombke", "Dozer 1.3 Released—Java Bean to Java Bean Mapper", http://www.theserverside.com/news/thread.tss?thread_id=34283, Posted Date: Jun. 1 2005, pp. 1-10.
"Amyn Batliwala", "Dynamic, Object to Object Converter", http://www.codeproject.com/KB/cs/DTO_to_Domain.aspx, The Code Project, Publication Date: Apr. 2, 2008, pp. 1-6.
"Sourceforge.Net", "Ezmorph", http://ezmorph.sourceforge.net/index.html, Downloaded Circa: Jan. 28, 2010, pp. 1-1.
"Wayne Beaton", "IBM Websphere Developer Technical Journal: Learning From Experience", http://www.ibm.com/developerworks/websphere/techjournal/0308_beaton/beaton.html, Publication Date: Jun. 2, 2003, pp. 1-6.
"Neon Tapir", "Introducing the Object Mapper", http://neontapir.wordpress.com/2009/12/23/introducing-the-object-mapper, Neon Tapir Blog at Wordpress.com, Publication Date: Dec. 23, 2009, pp. 1-2.
"Trustin Lee", "Lorentz 2.0 Released: A Generic Object Conversion Framework", http://www.theserverside.com/common/printthread.tss?thread_id=35700, Publication Date: Aug. 5, 2005, pp. 1-6.
Rob Howard', "Web Services With ASP.NET", http://msdn.microsoft.com/en-us/library/ms972326.aspx, Publication Date: Feb. 22, 2001, pp. 1-5.
"IBM Corporation", "Migrating Apache Soap Web Services to Web Services for J2EE Standards", http://publib.boulder.ibm.com/infocenter/wasinfo/v6r0/index.jsp?topic=/com.ibm.websphere.nd.multiplatform.doc/info/ae/ae/twbs_migratewbs.html, Updated Date: Jul. 17, 2009, pp. 1-6.
Gennady Agre et. al., "Migrating From Web Services to Semantic Web Services—Infrawebs Approach", Institute of Information Technologies—BAS, Bulgaria, Research Project No. 511723, Downloaded Circa: Aug. 5, 2009, pp. 1-5.
"Mike Lehmann", "Oracle Application Server 10G R3 (10.1.3.1)", An Oracle White Paper, Publication Date: Oct. 2006, pp. 1-31.
"Oracle Corporation", "Oracle Containers for J2EE Feature Overview", Downloaded Circa: Mar. 17, 2010, pp. 1-10.
"Oracle Corporation", "Oracle Weblogic Server: A Solid Foundation for Service-Oriented Architecture", An Oracle White Paper, Updated Date: Jun. 2008, pp. 1-15.
"Shenoy", "OTOM—Object to Object Mapping Framework", https://otom.dev.java.net/, Downloaded Circa: Mar. 18, 2010, pp. 1-2.

* cited by examiner

```
<definitions targetNamespace="http://tempuri.org/" xmlns="http://schemas.xmlsoap.org/wsdl/"
  xmlns:tns="http://tempuri.org/" xmlns:soapenc="http://schemas.xmlsoap.org/soap/encoding/"
  xmlns:soap="http://schemas.xmlsoap.org/wsdl/soap/" xmlns:s="http://www.w3.org/2001/XMLSchema">
 <types>
   <s:schema elementFormDefault="qualified" targetNamespace="http://tempuri.org/">
     <s:element name="RetArrayString1D">
        <s:complexType><s:sequence>
         <s:element minOccurs="0" maxOccurs="1" name="inArrayString1D" type="tns:ArrayOfString"/>
      </s:sequence></s:complexType>
    </s:element>
     <s:complexType name="ArrayOfString">
        <s:sequence>
         <s:element minOccurs="0" maxOccurs="unbounded" name="string" nillable="true" type="s:string"/>
        </s:sequence>
     </s:complexType>
    <s:element name="RetArrayString1DResponse">
          <s:complexType>
             <s:sequence>
              <s:element minOccurs="0" maxOccurs="1" name="RetArrayString1DResult" type="tns:ArrayOfString"/>
             </s:sequence>
          </s:complexType>
     </s:element>
    <s:element name="RetArrayDateTime1D">
        <s:complexType><s:sequence>
         <s:element minOccurs="0" maxOccurs="1" name="inArrayDateTime1D" type="tns:ArrayOfDateTime"/>
      </s:sequence></s:complexType>
    </s:element>
    <s:complexType name="ArrayOfDateTime">
        <s:sequence>
         <s:element minOccurs="0" maxOccurs="unbounded" name="dateTime" nillable="true" type="s:dateTime"/>
        </s:sequence>
    </s:complexType>
```

```
...
<s:element name="RetStructSNSA">
  <s:complexType><s:sequence>
    <s:element minOccurs="0" maxOccurs="1" name="inStructSNSA" type="tns:Employee"/>
  </s:sequence></s:complexType>
</s:element>
<s:complexType name="Employee">
  <s:sequence>
    <s:element minOccurs="0" maxOccurs="1" name="BaseDetails" type="tns:Person"/>
    <s:element minOccurs="1" maxOccurs="1" name="JobID" type="s:unsignedInt"/>
    <s:element minOccurs="1" maxOccurs="1" name="HireDate" type="s:dateTime"/>
    <s:element minOccurs="0" maxOccurs="1" name="numbers" type="tns:ArrayOfShort"/>
  </s:sequence>
</s:complexType>
<s:element name="RetStructSNSAResponse">
  ...
</s:element>
</s:schema>
</types>
<message name="RetArrayString1DSoapIn">
  <part name="parameters" element="tns:RetArrayString1D"/>
</message>
<message name="RetArrayString1DSoapOut">
  <part name="parameters" element="tns:RetArrayString1DResponse"/>
</message>
...
<message name="RetStructSNSASoapIn">
  <part name="parameters" element="tns:RetStructSNSA"/>
</message>
<message name="RetStructSNSASoapOut">
  <part name="parameters" element="tns:RetStructSNSAResponse"/>
</message>
```

*FIG. 4B*

```
<portType name="ComplexDataTypesDocLitWServiceSoap">
    <operation name="RetArrayString1D">
        <input message="tns:RetArrayString1DSoapIn"/>
        <output message="tns:RetArrayString1DSoapOut"/>
    </operation>
    <operation name="RetArrayDateTime1D">
        <input message="tns:RetArrayDateTime1DSoapIn"/>
        <output message="tns:RetArrayDateTime1DSoapOut"/>
    </operation>
  ...
</portType>
<binding name="ComplexDataTypesDocLitWServiceSoap" type="tns:ComplexDataTypesDocLitWServiceSoap">
  <soap:binding transport="http://schemas.xmlsoap.org/soap/http"/>
    <operation name="RetArrayString1D">
        <soap:operation style="document" soapAction="http://tempuri.org/RetArrayString1D"/>
        <input><soap:body use="literal"/></input>
        <output><soap:body use="literal"/></output>
    </operation>
  ...
</binding>
...
<service name="ComplexDataTypesDocLitWService">
  <port name="ComplexDataTypesDocLitWServiceSoap" binding="tns:ComplexDataTypesDocLitWServiceSoap">
    <soap:address location="http://wsip3.us.acme.com/DotNet20Service/ComplexDataTypes/DocLitWService.asmx"/>
  </port>
...
</service>
</definitions>
```

```
<java-wsdl-mapping xmlns= "http://java.sun.com/xml/ns/j2ee" version="1.1">   ← 510
  <package-mapping>
    <package-type>test.sei.generated</package-type>
    <namespaceURI>http://tempuri.org/</namespaceURI>
  </package-mapping>
  ...
  <java-xml-type-mapping>                                                      ┐ 530
    <java-type>test.sei.generated.Employee</java-type>
    <root-type-qname xmlns:typeNS="http://tempuri.org/">typeNS:Employee</root-type-qname>
    <qname-scope>complexType</qname-scope>
    <variable-mapping>
      <java-variable-name>baseDetails</java-variable-name>
      <xml-element-name>BaseDetails</xml-element-name>
    </variable-mapping>
    <variable-mapping>
      <java-variable-name>jobID</java-variable-name>
      <xml-element-name>JobID</xml-element-name>
    </variable-mapping>
    <variable-mapping>
    <java-variable-name>hireDate</java-variable-name>
      <xml-element-name>HireDate</xml-element-name>
    </variable-mapping>
    <variable-mapping>
      <java-variable-name>numbers</java-variable-name>
      <xml-element-name>numbers</xml-element-name>
  </variable-mapping>
  </java-xml-type-mapping>                                                     ┘
  <java-xml-type-mapping>                                                      ┐ 540
    <java-type>java.util.Calendar[]</java-type>
    <root-type-qname xmlns:typeNS="http://tempuri.org/">typeNS:ArrayOfDateTime</root-type-qname>
    <qname-scope>complexType</qname-scope>
  </java-xml-type-mapping>                                                     ┘
  ...
```

*FIG. 5A*

```
<service-interface-mapping>
  <service-interface>test.sei.generated.ComplexDataTypesDocLitWService</service-interface>
  <wsdl-service-name>serviceNS:ComplexDataTypesDocLitWService</wsdl-service-name>
  <port-mapping>
    <port-name>ComplexDataTypesDocLitWServiceSoap</port-name>
    <java-port-name>ComplexDataTypesDocLitWServiceSoap</java-port-name>
  </port-mapping>
</service-interface-mapping>
<service-endpoint-interface-mapping>
   <service-endpoint-interface>test.sei.generated.ComplexDataTypesDocLitWServiceSoap   <- 565
   </service-endpoint-interface>
 <service-endpoint-method-mapping>
    <java-method-name>retArrayDateTime1D</java-method-name>   <- 571
    <wsdl-operation>RetArrayDateTime1D</wsdl-operation>   <- 572
    <wrapped-element />
    <method-param-parts-mapping>
      <param-position>0</param-position>
      <param-type>java.util.Calendar[]</param-type>
      <wsdl-message-mapping>
        <wsdl-message>wsdlMsgNS:RetArrayDateTime1DSoapIn</wsdl-message>
        <wsdl-message-part-name>inArrayDateTime1D</wsdl-message-part-name>
        <parameter-mode>IN</parameter-mode>
      </wsdl-message-mapping>
    </method-param-parts-mapping>
    <wsdl-return-value-mapping>
      <method-return-value>java.util.Calendar[]</method-return-value>
      <wsdl-message>wsdlMsgNS:RetArrayDateTime1DSoapOut </wsdl-message>
      <wsdl-message-part-name>RetArrayDateTime1DResult</wsdl-message-part-name>
    </wsdl-return-value-mapping>
 </service-endpoint-method-mapping>
 ...
<service-endpoint-interface-mapping>
</java-wsdl-mapping>
```

```
<WsMigrationConfig xmlns:xsd="http://www.w3.org/2001/XMLSchema" ws:type="WsMigrationConfig">
  <explodedArtifactDir>C:\work\patend\output\exploded\ComplexDataTypesDocLitWServiceSoap1013_2ports
  </explodedArtifactDir>
610
  <artifactType ws:type="ARTIFACT_TYPE">EAR</artifactType> <-- 620
  <stackId  xsi:type="string">OC4J1013</stackId> <-- 630
  <stackHome xsi:nill="true"></stackHome>
  <classpath  xsi:type="string">;C:\work\...\ComplexDataTypesDocLitWServiceSoap-web\WEB-INF\lib\wsiputils.jar; ...
  </classpath>
 <serviceConfig ws:type="WsConfig[]">
  <WsConfig ws:type="WsConfig">
   <explodedDir >C:\work\...\ComplexDataTypesDocLitWServiceSoap-web</explodedDir>
   <wsdlLocation>C:\work\...\WEB-INF\wsdl\ComplexDataTypesDocLitWService.wsdl</wsdlLocation>
        <mappingFileLocation>C:\work\...\WEB-INF\ComplexDataTypesDocLitWService-java-wsdl-mapping.xml
   </mappingFileLocation>
640
   ...
   <ports ws:type="WsPort[]">
    <WsPort ws:type="WsPort">
      <serviceQName  xsi:type="string">{http://tempuri.org/}ComplexDataTypesDocLitWService</serviceQName>
      <portName  xsi:type="string">ComplexDataTypesDocLitWServiceSoap</portName>
      <portTypeQName  xsi:type="string">{http://tempuri.org/}ComplexDataTypesDocLitWServiceSoap</portTypeQName>
      <implClassName  xsi:type="string">test.GeneratedImpl</implClassName>
      <seiClassName  xsi:type="string">test.sei.generated.ComplexDataTypesDocLitWServiceSoap</seiClassName>
      <contextUri  xsi:type="string">ComplexDataTypesDocLitWServiceSoap</contextUri>
      <servletName  xsi:type="string">ComplexDataTypesDocLitWServiceSoap</servletName>
      <stackSpecificProperties xsi:nill="true"></stackSpecificProperties>
      <policyStore xsi:nill="true"></policyStore>
650
    </WsPort>
   </ports>
   <businessServiceType ws:type="COMPONENT_TYPE">POJO</businessServiceType>
  </WsConfig>
 </serviceConfig>
</WsMigrationConfig>
```

*FIG. 6A*

```
<WsMigrationConfig xmlns:xsd="http://www.w3.org/2001/XMLSchema" ws:type="WsMigrationConfig">
  <explodedArtifactDir>C:\work\patend\output\intermediate\ComplexDataTypesDocLitWServiceSoap1013_2ports
   </explodedArtifactDir>
  <artifactType ws:type="ARTIFACT_TYPE">WAR</artifactType>                    ← 660
  <stackId  xsi:type="string">WLS103RPC</stackId>                             ← 670
  <stackHome  xsi:type="string">c:\bea103\wlserver_10.3</stackHome>           ← 675
  <antHome  xsi:type="string">c:\bea103\modules\org.apache.ant_1.6.5</antHome>
  <javaHome  xsi:type="string">c:\bea103\jrockit_160_05</javaHome>
  <classpath>;;C:\work\...\ComplexDataTypesDocLitWServiceSoap_ComplexDataTypesDocLitWServiceSoap\
        WEB-INF\classes;... </classpath>
  <serviceConfig ws:type="WsConfig[]">
    <WsConfig ws:type="WsConfig">
      <explodedDir>C:\work\...\ComplexDataTypesDocLitWServiceSoap_ComplexDataTypesDocLitWServiceSoap
      </explodedDir>
      <wsdlLocation  xsi:type="string">C:\work\...\WEB-INF\wsdls\ComplexDataTypesDocLitWService.wsdl</wsdlLocation>
      <mappingFileLocation  xsi:type="string">C:\work\...\WEB-INF\ComplexDataTypesDocLitWService.xml
      </mappingFileLocation>
680   <ports ws:type="WsPort[]">
        <WsPort ws:type="WsPort">
          <serviceQName  xsi:type="string">{http://tempuri.org/}ComplexDataTypesDocLitWService</serviceQName>
          <portName  xsi:type="string">ComplexDataTypesDocLitWServiceSoap</portName>
          <portTypeQName>{http://tempuri.org/}ComplexDataTypesDocLitWServiceSoap</portTypeQName>
          <implClassName  xsi:type="string">org.tempuri.ComplexDataTypesDocLitWServiceSoapImpl</implClassName>
          <seiClassName>org.tempuri.ComplexDataTypesDocLitWServiceSoapImplPortType</seiClassName>
          <contextUri  xsi:type="string">/ComplexDataTypesDocLitWServiceSoap</contextUri>
          <servletName  xsi:type="string">ComplexDataTypesDocLitWServiceServlethttp</servletName>
        </WsPort>
690   </ports>
    </WsConfig>
   ...
  </serviceConfig>
</WsMigrationConfig>
```

*FIG. 6B*

```
package org.tempuri;  ← 710

import javax.jws.*;
import javax.jws.soap.*;                                                          715

@WebService(name="ComplexDataTypesDocLitWServiceSoap", targetNamespace="http://tempuri.org/",
      wsdlLocation="/wsdls/ComplexDataTypesDocLitWService.wsdl")
@SOAPBinding(style=SOAPBinding.Style.DOCUMENT, use=SOAPBinding.Use.LITERAL,
      parameterStyle=SOAPBinding.ParameterStyle.WRAPPED)
public interface ComplexDataTypesDocLitWServiceSoap {                             720

   @WebMethod(action="http://tempuri.org/RetArrayString1D", operationName="RetArrayString1D")
   @WebResult(name="RetArrayString1DResult")
   public org.tempuri.ArrayOfString retArrayString1D(                             ← 742
         @WebParam(name="inArrayString1D") org.tempuri.ArrayOfString inArrayString1D); ← 745
                                                                                  740
   @WebMethod(action="http://tempuri.org/RetArrayDateTime1D",   operationName="RetArrayDateTime1D")
   @WebResult(name="RetArrayDateTime1DResult")
   public org.tempuri.ArrayOfDateTime retArrayDateTime1D(                         ← 762
         @WebParam(name="inArrayDateTime1D") org.tempuri.ArrayOfDateTime inArrayDateTime1D); ← 765
                                                                                  760
   @WebMethod(action="http://tempuri.org/RetArray1D_SN", operationName="RetArray1D_SN")
   @WebResult(name="RetArray1D_SNResult")
   public org.tempuri.ArrayOfPerson retArray1D_SN(
         @WebParam(name="inArray1D_SN") org.tempuri.ArrayOfPerson inArray1D_SN);

   @WebMethod(action="http://tempuri.org/RetStructSNSA", operationName="RetStructSNSA")
   @WebResult(name="RetStructSNSAResult")
   public org.tempuri.Employee retStructSNSA(
      @WebParam(name="inStructSNSA") org.tempuri.Employee inStructSNSA);
   ...
}
```

*FIG. 7*

```
package org.tempuri;

@javax.jws.WebService(endpointInterface = "org.tempuri.ComplexDataTypesDocLitWServiceSoap",
    wsdlLocation = "", name = "", serviceName = "ComplexDataTypesDocLitWService", portName = "",
    targetNamespace = "http://tempuri.org/")
@weblogic.jws.WLHttpTransport(serviceUri = "DocLitWService.asmx",
    contextPath = "DotNet20Service/ComplexDataTypes", portName = "ComplexDataTypesDocLitWServiceSoap")
public class ComplexDataTypesDocLitWServiceSoapImpl{
    private test.GeneratedImpl _businessImpl = null;
    public ComplexDataTypesDocLitWServiceSoapImpl(){
        try{
            _businessImpl = new test.GeneratedImpl();
        }catch (java.lang.Exception e){
            throw new RuntimeException("Unable to instantiate original business logic",e);
        }
    }

    public org.tempuri.ArrayOfString retArrayString1D(org.tempuri.ArrayOfString _actualArg0){
        org.tempuri.ArrayOfString _actualRet = null;
        try{
            java.lang.String[] _migratedArg0 = null;
            _migratedArg0 = ComplexDataTypesDocLitWServiceSoapImplCopyUtils.copy(_actualArg0);
            java.lang.String[] _ret2BMigrated = _businessImpl.retArrayString1D(_migratedArg0);
            _actualRet = ComplexDataTypesDocLitWServiceSoapImplCopyUtils.copy(_ret2BMigrated);
            return _actualRet;
        }
        catch(Throwable e){
            if (e instanceof ThreadDeath){
                throw (java.lang.ThreadDeath)e;
            }
            throw new java.lang.RuntimeException("ENDPOINT EXCEPTION :==>" + e.getMessage(), e);
        }
    }
}
```

FIG. 8A

```
public org.tempuri.ArrayOfDateTime retArrayDateTime1D(org.tempuri.ArrayOfDateTime _actualArg0){
  org.tempuri.ArrayOfDateTime _actualRet = null;
  try{
    java.util.Calendar[] _migratedArg0 = null;
    _migratedArg0 = ComplexDataTypesDocLitWServiceSoapImplCopyUtils.copy(_actualArg0);  ← 852
    java.util.Calendar[] _ret2BMigrated = _businessImpl.retArrayDateTime1D(_migratedArg0);
    _actualRet = ComplexDataTypesDocLitWServiceSoapImplCopyUtils.copy(_ret2BMigrated);  ← 856
    return _actualRet;
  }
  catch(Throwable e){
    ...
  }
}                                                                                         ⎫
...                                                                                       ⎬ 850
public org.tempuri.Employee retStructSNSA(org.tempuri.Employee _actualArg0){              ⎭
  org.tempuri.Employee _actualRet = null;
  try{
    test.sei.generated.Employee _migratedArg0 = null;
    _migratedArg0 = ComplexDataTypesDocLitWServiceSoapImplCopyUtils.copy(_actualArg0);
    test.sei.generated.Employee _ret2BMigrated = _businessImpl.retStructSNSA(_migratedArg0);
    _actualRet = ComplexDataTypesDocLitWServiceSoapImplCopyUtils.copy(_ret2BMigrated);
    return _actualRet;
  }
  catch(Throwable e){
    ...
  }
}                                                                                         ⎫
...                                                                                       ⎬ 870
                                                                                          ⎭
```

*FIG. 8B*

```
package org.tempuri;

public class ComplexDataTypesDocLitWServiceSoapImplCopyUtils{   <-- 910

  public static org.tempuri.ArrayOfDateTime copy(java.util.Calendar[] arg){
      try{
            org.tempuri.ArrayOfDateTime ret = null;
            ret = new org.tempuri.ArrayOfDateTime();        //    Null check ignored ...
            ret.setDateTime(arg);
            return ret;
      }catch (java.lang.Exception e){
            throw new RuntimeException("Glue code copy has failed.",e);
      }
  }
920

  public static test.sei.generated.Employee copy(org.tempuri.Employee arg){
      try{
            test.sei.generated.Employee ret = null;
         if (arg == null){  return ret; }            //    null check
            ret = new test.sei.generated.Employee();
         ret.setBaseDetails(copy(arg.getBaseDetails()));
            ret.setJobID(arg.getJobID());
            ret.setHireDate(arg.getHireDate());
         ret.setNumbers(copy(arg.getNumbers()));
            return ret;
      }catch (java.lang.Exception e){
            throw new RuntimeException("Glue code copy has failed.",e);
      }
  }
940
  ...
```

FIG. 9A

```
960
    public static java.lang.String[] copy(org.tempuri.ArrayOfString arg){
    try{
            java.lang.String[] ret = null;
            if (arg == null){  return ret; }                //    null check
            ret = arg.getString();
            return ret;
    }catch (java.lang.Exception e){...}
}
980
public static org.tempuri.ArrayOfPerson copy(test.sei.generated.Person[] arg){
    try{
            org.tempuri.ArrayOfPerson ret = null;
            ret = new org.tempuri.ArrayOfPerson();      //    Null check ignored ...
            ret.setPerson(copyOverLoaded_1(arg));
            return ret;
    }catch (java.lang.Exception e){...}
}

public static org.tempuri.Person[] copyOverLoaded_1(test.sei.generated.Person[] arg){
    try{
            org.tempuri.Person[] ret = null;
            if (arg == null){  return ret; }                //    null check
            ret = new org.tempuri.Person[arg.length];
            int count = -1;
            for (test.sei.generated.Person item : arg){
                count ++;
                ret[count] = copy(item);
            }
            return ret;
    }catch (java.lang.Exception e){...}
}
}
```

FIG. 9B

FACILITATING A SERVICE APPLICATION TO OPERATE WITH DIFFERENT SERVICE FRAMEWORKS IN APPLICATION SERVERS

RELATED APPLICATIONS

The present application is related to and claims priority from the co-pending U.S. provisional patent application entitled, "Simplifying Migration Of Web Service From One Web Service Stack To Another", Ser. No. 61/240,242, Filed: 7 Sep. 2009, Applicant: Oracle International Corporation, naming the same inventors Velmurugan Subramanian and Suresh Srinivasan as in the subject patent application, and is incorporated in its entirety herewith.

BACKGROUND OF THE INVENTION

1. Technical Field

The present disclosure relates to application servers and more specifically to facilitating a service application to operate with different service frameworks.

2. Related Art

Application servers refer to server systems which provide web services accessible from other systems according to a contract. A contract specifies the format of invoking a web service (sending the request), the format of the response, etc. The contract is specified in a structured format such as XML, which makes the content machine-understandable. Other systems can request such contracts on a network and then invoke the services according to the received specification. Web Service Definition Language (WSDL) is a common language used for specifying contracts for web services, as is well known in the relevant arts.

Service frameworks (hereafter "frameworks") and service applications are generally executed in application servers to provide such web services. As is well known, a framework processes web service requests received according to a contract by interacting with service applications. To facilitate such interaction, the framework defines an interface according to which each service application is to be implemented. Each service application contains the program logic underlying the web services, and in addition, needs to be implemented according to defined interface to operate with the framework.

It is often desirable that a service application operate with different service frameworks in application servers.

BRIEF DESCRIPTION OF THE DRAWINGS

Example embodiments of the present invention will be described with reference to the accompanying drawings briefly described below.

FIGS. 4A-4C together depicts samples portions of a WSDL file (contract) specifying the details of a web service in one embodiment.

FIGS. 5A-5B depicts portions of a source mapping specifying the procedure definitions to which a source framework maps the operations of a web service specified according to a contract in one embodiment.

FIGS. 6A and 6B depict portions of configuration files respectively specifying the details of a source framework and a target framework in one embodiment.

FIG. 7 depicts sample portions of a service endpoint interface (SEI) defined for a WSDL file (contract) by target framework in one embodiment.

FIGS. 8A-8B together depicts portions of wrapped code generated based on the differences identified between the interfaces of different frameworks in one embodiment.

FIG. 9A-9B depicts portions of a copy utility module that facilitates conversion of different data types in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention facilitates a service application to operate with different frameworks executing in application servers. In one embodiment, the different interfaces according to which the different frameworks are designed to operate with service applications are identified, including the interface implemented by the service application. Wrapper modules are then generated based on the differences between the identified interfaces and the interface implemented by the service application. The generated wrapper modules are then deployed along with the service application to facilitate the service application to operate with different frameworks.

In one embodiment, a first interface (according to which a first framework is designed to operate with a service application) contains a first set of procedure definitions corresponding to a set of operation defined in the contract for the web service and a second interface (according to which a second framework is designed to operate) contains a second set of procedure definitions corresponding to the same set of operations. Accordingly, the wrapper module is generated based on the differences between a corresponding one of the first set of procedure definitions and a corresponding one of the second set of procedure definitions for each of the set of operations.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
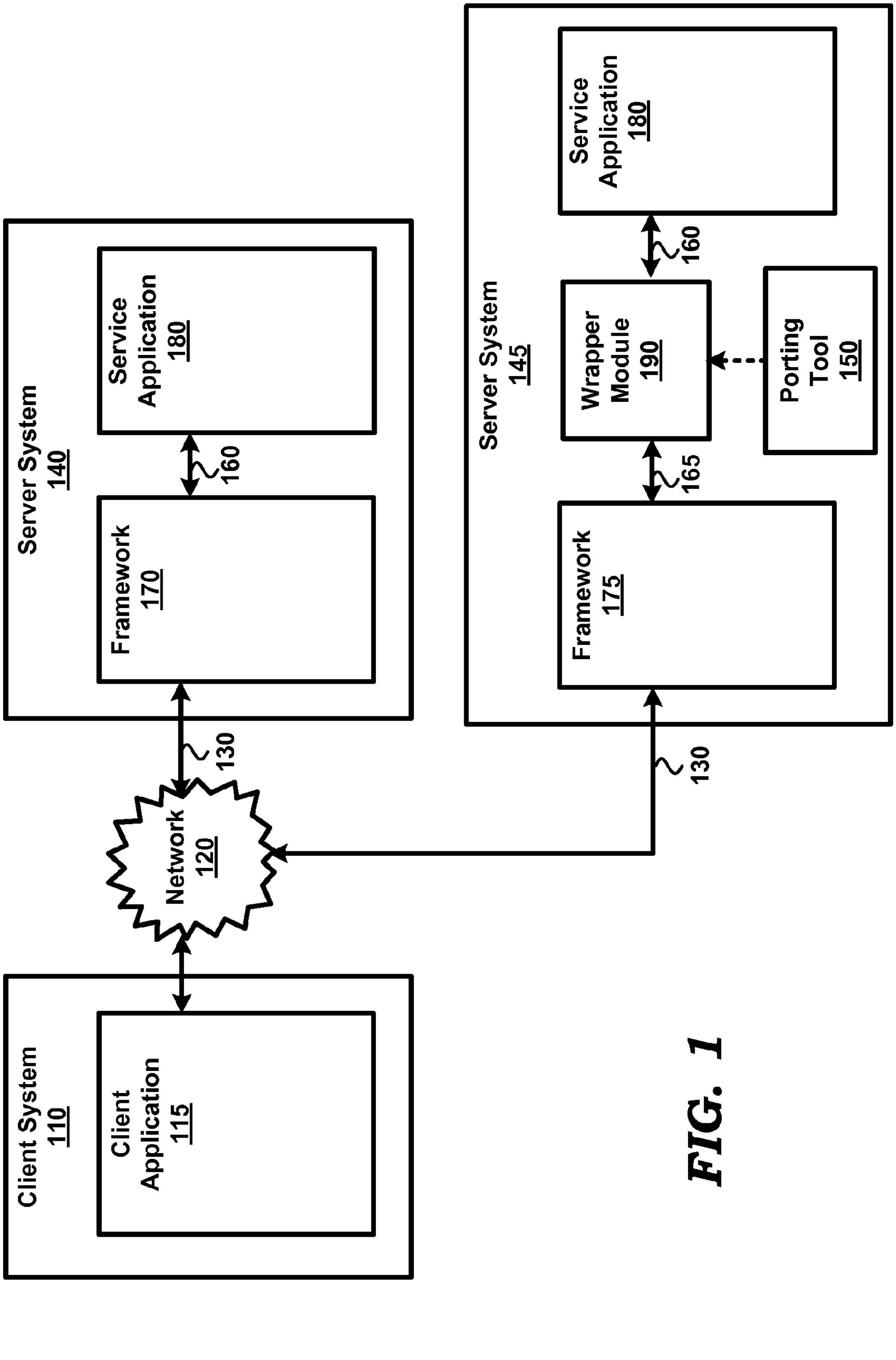
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client system 110 (which in turn, is shown containing client application 115), network 120, service 130, and server systems 140/145. Server system 140 is shown containing framework 170 (having interface 160) and service application 180, while server system 145 is shown containing porting tool 150, framework 175 (having interface 165), service application 180 and wrapper module 190.

Merely for illustration, only representative number/types of systems are shown in FIG. 1. Many environments often contain many more systems, both in number and type, and hosting different/multiple web services, depending on the purpose for which the environment is designed. Each system/device of FIG. 1 is described below in further detail.

Network 120 provides connectivity between client system 110 and server systems 140 and 145. Network 120 may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered.

Client system 110 represents a system such as a personal computer, workstation, mobile station, etc., used by users to generate requests for invocation of web services (such as service 130) hosted on server systems 140/145. The requests may be generated using appropriate user interfaces provided by applications, such as client application 115, executing in client system 110. In general, client application 115 sends requests for invocation of specific web services to perform desired tasks to server systems 140/145 (in particular to frameworks 170/175) and receives corresponding responses containing the results of invocation of the requested services (which may then be displayed to the users).

Server system 140 represents an application server executing one or more enterprise applications, such as service application 180, which implement the program logic underlying the various web services (such as service 130) provided by server system 140. Server system 140 may also execute other software programs such as operating systems, device drivers, virtual machines, etc., which provide a (common) run time environment for execution of the enterprise applications.

Framework 170 (also commonly referred to as web service protocols stack) facilitates web services to be hosted on server system 140. In particular, framework 170 enables different web services to be defined and implemented, as well as to be located by providing the contact to the client systems. Framework 170 also facilitates the hosted web services to be invoked by client applications (such as 115) executing in client systems (such as 110) using standard protocols such as HTTP (Hyper Text Transfer Protocol) and SOAP. In one embodiment, framework 170 represents a web service stack such as Oracle Application Server (OAS) web services stack available from Oracle Corporation, .NET web services stack available from Microsoft Corporation, etc., which facilitates hosting of web services on server system 140.

Service 130 represents a web service provided by server system 140 (in particular framework 170) according to a contract specified in WSDL (web service definition language). As is well known, service 130 contains one or more operations that may be invoked by client application 115, with the contract specifying the format of sending a service request, the format of the response, the operations provided by service 130, input/output parameters for each of the operations, the type of each parameter, etc. Service 130 is identified by and accessed using a unique Universal Resource Identifier (URI).

Framework 170 receives web service requests from client systems and then forwards the requests (based on URI and operation requested) to the corresponding implementations. Framework 170 further receives the results of the requested invocations from the implementations, and then sends corresponding responses (containing the results) to the requesting client systems. To facilitate interaction (forwarding the invocations, receiving the results, etc.) with the implementations, framework 170 defines interface 160 according to which the corresponding implementations are to be created. In one common approach, the implementations of the operations contained in a single web service (such as 130) form components of a service application such as 180, and accordingly service implementation 130 is required to be created according to interface 160.

In one embodiment, interface 160 is provided in a programming language (such as Java™ language available from Sun Corporation) with each operation specified in the contract mapped to a corresponding procedure definition in the programming language. Service application 180 is implemented/created by providing the desired program logic (for each operation) as the body of the procedure definitions in the same programming language.

Server system 145 represents another application server which provides the same web service 130 as provided by server system 140, but having a different framework 175. A different framework implies that interface 165 is different from interface 160 (for example, having different procedure definitions when provided in a programming language). Such different frameworks may be present due to, for example, upgrade of application development/run-time environment (e.g., from OC4J application platform to Weblogic application platform, both available from Oracle Corporation), migration of the service application (as part of migration of an enterprise system, e.g., Human resources system, ERP system) to different platforms/frameworks.

It should be noted that framework 175 can be requested to work with interface 160, thereby enabling the same service application 180 to be deployed in both server systems 140 and 145. However, such a request may cause framework 175 to generate a new contract/WDSL corresponding to interface 160, the new contract being different from that used for invoking service 130 hosted on server system 140. Such a change in the WSDL may necessitate client applications (such as 115) invoking the web service to be modified for operation with different formats/WSDLs for invoking the same service (assuming that service 130 is accessed using the same URI on both server systems 140 and 145).

It may be desirable that service application 180 be operative with different frameworks (170 and 175) without necessitating changes to client applications invoking the web service. In other words, the client applications continue to send requests to service 130 according to the same contract/WSDL irrespective of whether service 130 is hosted by framework 170 or 175. Such an objective may be particularly desirable when service applications forming part of an enterprise system are required to be migrated without disrupting the operation of the other applications (who may be invoking the web service) in the enterprise system.

In one prior approach to meeting such an objective, users/developers manually identify the differences between the interfaces (160 and 165) and then modify the instructions constituting service application 180 to incorporate the identified differences. By modifying the service application to operate with interface 165, framework 175 is enabled to operate with the same WSDL as used by framework 170. As may be appreciated, such an approach may require substantial amount of time/resources to be spent and is prone to mistakes.

Wrapper module 190, generated according to an aspect of the present invention, represents an executable module that is designed to convert between the different interfaces (such as 160 and 165) of respective different frameworks (such as 170 and 175). Thus, service application 180 is facilitated to operate with different frameworks, as described below with examples.

3. Facilitating a Service Application to Operate with Different Frameworks

Figure 2:
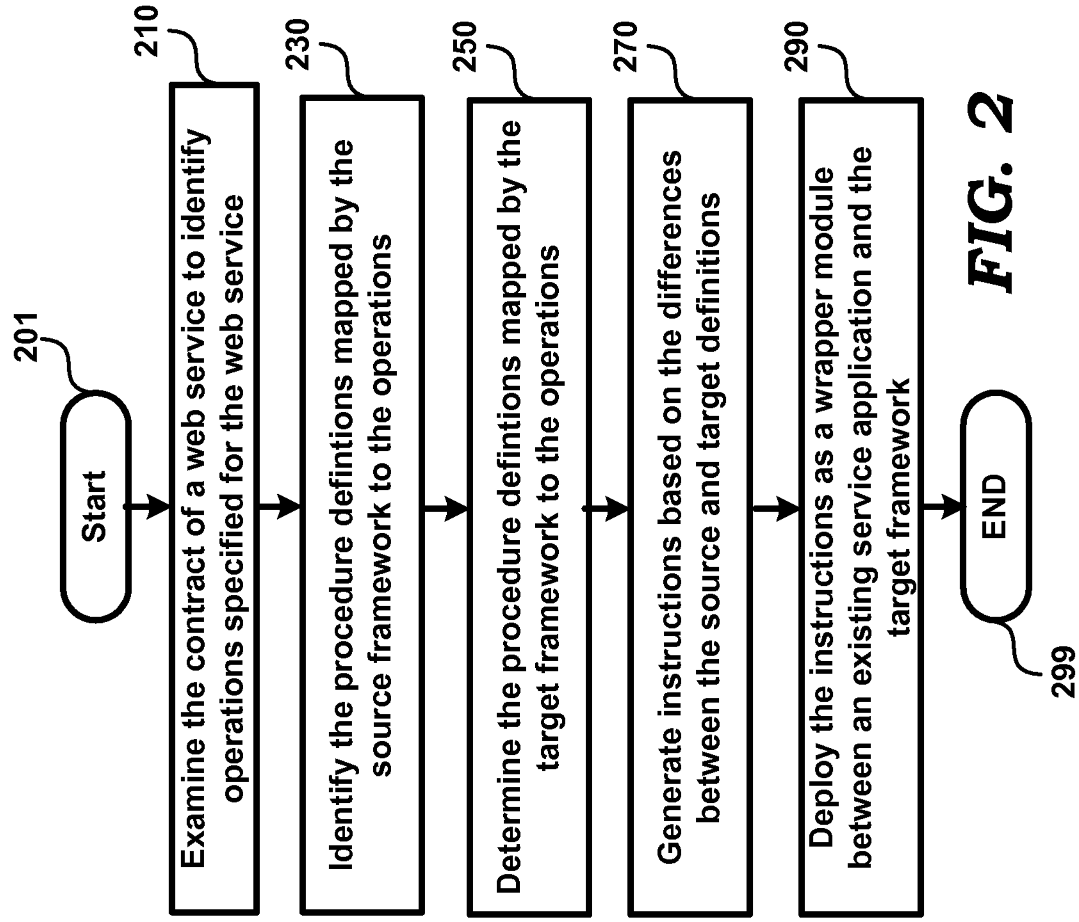
FIG. 2 is a flow chart illustrating the manner in which a service application is facilitated to operate with different service frameworks according to an aspect of the present invention.

FIG. 2 is a flow chart illustrating the manner in which a service application is facilitated to operate with different service frameworks according to an aspect of the present invention. The flowchart is described with respect to FIG. 1 merely for illustration. However, the features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, porting tool 150 examines the contract of a web service (130) to identify the operations specified for the web service. Porting tool 150 may also identify the specific format for each of the operations, such as the name of the operation, the names of the input/output parameters for each operation, the data types of each parameter, etc.

In step 230, porting tool 150 identifies the procedure definitions (hereafter "source definitions") mapped by the source framework (e.g. 170) to the operations of the contract. The identified source definitions forms the interface (160) required by the source framework (170) to interact with the corresponding implementations (hereafter "source implementations"). In other words, a source definition represents the part of the interface that needs to be implemented for interfacing with the source framework for a corresponding operation.

As noted above, source implementations for a single web service commonly form components of a single service application (such as 180). Accordingly, the identification of the procedure definitions may be performed by inspecting the source code of an existing implementation (such as service application 180). Alternatively, a compiled/executable form of service application 180 may be inspected using techniques such as reflection, as is well known in the relevant arts.

In step 250, porting tool 150 determines the procedure definitions (hereafter "target definitions") mapped/defined by the target framework (e.g. 175) to the operations in the contract. The identified target definitions forms the interface (165) required by the target framework (170), with each target definition represents the part of the interface that needs to be implemented for interfacing with the target framework for a corresponding operation.

The determination of the definitions may be performed by requesting the target framework (175) to provide the corresponding interface (165) for hosting the same web service (examined in step 210). In one embodiment described below, a tool provided by the target framework (175) is used to generate the corresponding interface (165), which is then inspected to determine the target definitions.

In step 270, porting tool 150 generates instructions based on the differences between the source and target definitions. The generated instructions forms the implementations for the target definitions (hereafter "target implementations"). Accordingly, a target implementation (for an operation) may be generated based on determining the differences between the corresponding target definition (determined in step 250) and the source definition (identified in step 230) for the operation.

Thus, in a scenario where the definitions are determined to differ only in the names of the procedures/parameters, the implementation of the target definition may include instructions to invoke the corresponding existing source implementation (in service application 180). Furthermore, if the data types of the parameters in the source and target definitions are determined to be different, instructions may be generated for converting between the different data types specified in the source and target definitions. A target implementation may not be generated if the source and target definitions are determined to be the same/similar.

In step 290, porting tool 150 deploys the generated instructions (target implementations) as a wrapper module (190) between an existing service application (180 containing the source implementations) and the target framework (175), thereby facilitating service application 180 to operate with target framework (175). The flowchart ends in step 299.

Thus, a service application is facilitated to operate with different frameworks in application servers. It may be observed that the service application is not modified to facilitate operation with the different frameworks. Furthermore, the generation of the wrapper module based on the differences between the source and target definitions may ensure that only the required set of instructions/conversions are performed.

The manner in which porting tool 150 may generate wrapper module 190 to facilitate service application 180 to operate with different frameworks (170 and 175) is described below with examples.

4. Example Implementation

FIGS. 3, 4A-4C, 5A-5C, 6A-6B, 7, 8A-8B, 9A-9B together illustrates the manner in which wrapper modules, facilitating a service application to operate with different frameworks, are generated in one embodiment. Each of the Figures is described in detail below.

In the following description, it is assumed that source framework 170 is an OC4J web service stack, while target framework 175 is a Web Logic web service stack. It is noted that both the frameworks provide interfaces in Java™ programming language, and accordingly the service applications are shown as containing instructions in the Java programming language. Furthermore, it is assumed that the contract is according to WSDL and specifies the details of a single web service (130).

However, in alternative embodiments, the frameworks may be of other types, the contracts may be in any desired format (specifying one or more web services), the interfaces may be in any other programming environment/language (such as .NET/C#), without departing from the scope and spirit of several aspects of the present invention, as will be apparent to one skilled in the relevant arts by reading the disclosure herewith.

Figure 3:
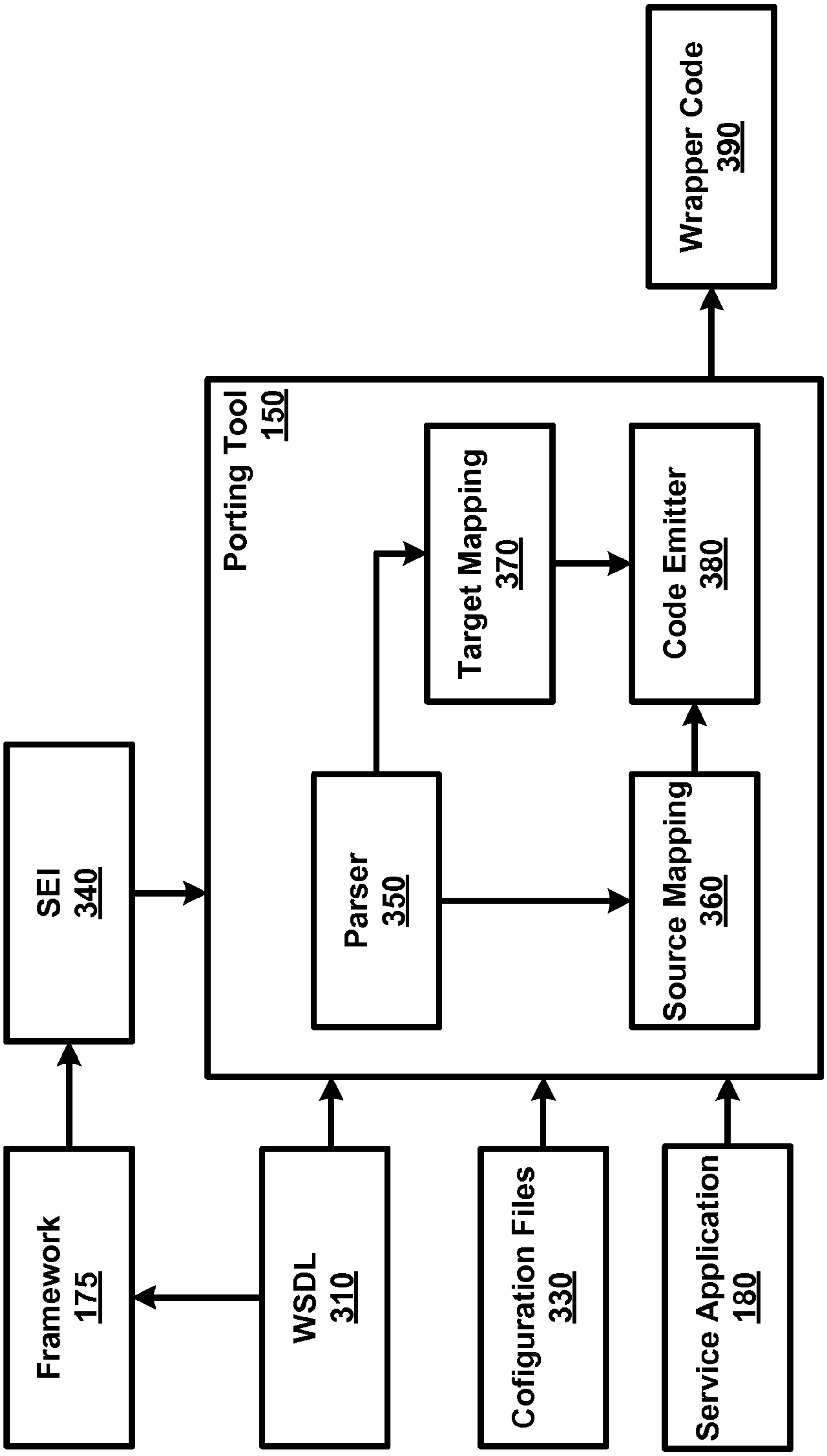
FIG. 3 is a block diagram illustrating the details of implementation of a porting tool in one embodiment.

FIG. 3 is a block diagram illustrating the details of implementation of porting tool 150 in one embodiment. The block diagram is shown containing framework 175, service application 180, WSDL 310, configuration files 330, service endpoint interface (SEI) 340, parser 350, source mapping 360, target mapping 370, code emitter 380 and wrapper code 390. Each of the blocks is described in detail below.

WSDL 310 is in the form of an XML document which specifies the details of a service 130 accessible at a corresponding URI such as the operations contained in the web service, the input/output parameters of each operation, etc. WSDL 310 may be published and accessed at another URI (typically in the form of the web service URI appended with the text "?wsdl") over network 120 by client systems (such as 110).

FIGS. 4A-4C together depicts samples portions of a WSDL file (contract) specifying the details of a web service (such as service 130) in one embodiment. For conciseness, only the relevant portions are included and described. However, typical contracts contain several more portions, as is well known in the relevant arts.

Each of data portions 420, 425, 430, 440 and 445 specifies the details of data types used in the WSDL file as well as the input/output elements that may be included in the web service request/response. In particular, data portion 420 specifies an element "RetArrayString1D" of the complex type "ArrayOfString", which in turn is specified as a sequence (0 or more) of string elements (of type string). Similarly, data portion 425 specifies another element named "RetArrayString1DResponse" of the complex type "ArrayOfString", while data portion 430 specifies an element "RetArrayDateTime1D" of the complex type "ArrayOfDateTime".

Data portion 440 specifies an element named "RetStructSNSA" of the complex type "Employee", which in turn is specified as containing the elements "BaseDetails", "JobID", "HireDate" and "numbers" of the respective types Person (not shown), unsignedInt, dateTime and ArrayOfShort. Data portion 445 specifies an element named "RetStructSNSAResponse" similar to data portion 440.

Data portion 450 specifies the formats of the messages that can be received/sent by the web service, with each of data portions 452 and 454 specifying the details of a single message/format. Data portion 452 specifies a message named "RetArrayString1DSoapIn" containing an instance of the "RetArrayString1D" element specified in data portion 420, while data portion 452 specifies another message named "RetArrayString1DSoapOut" containing an instance of the "RetArrayString1DResponse" element specified in data portion 425.

Data portion 470 specifies the input/output formats for the operations contained in the web services, while data portion 475 specifies the formats for a single operation named "RetArrayString1D". Each of the input/output formats in data portion 475 is specified as references to messages (by using the message names) specified in data portion 450. Thus, data portion 475 specifies that the operation "RetArrayString1D" takes as input the message specified in data portion 452 (an instance of the element "RetArrayString1D") and provides as output the message specified in data portion 454 (an instance of the element "RetArrayString1DResponse"). The input/output formats for other operations may be specified similar to data portion 475.

Data portion 480 specifies the set of the operations contained in the web service, as well as the input/output protocols to be used for the requests/responses for invoking each of the operations. Data portion 480 further specifies that the input/output formats are to be according to the port type "ComplexDataTypesDocLitWServiceSoap" (specified in data portion 470).

Data portion 485 specifies that an operation named "RetArrayString1D" is required to use the SOAP protocol (well known in the relevant arts) as the input/output protocols. It may be observed that data portions 475 and 485 are specified for the same operation (based on the name), and accordingly, the operation "RetArrayString1D" is required to be invoked using the input/output formats of data portion 475 and also the input/output protocols of data portion 485. The protocols for other operations may be specified similar to data portion 485.

Data portion 490 specifies that a service named "ComplexDataTypesDocLitWService" supporting the set of operations defined by the binding specified in data portion 480 (having the name "ComplexDataTypesDocLitWServiceSoap") is accessible at the URI "http://wsip3.us.acme.com/DotNet20Service/ComplexDataTypes/DocLitWService.asmx".

Thus, the contract specifies that a client system/application (such as 110/115) wishing to invoke service 130 is required to send a request (to the URI noted above) containing the name of the specific operation to be invoked (such as "RetArrayString1D") along with values for inputs (such as an element "RetArrayString1D") according to the respective input formats (data type "ArrayOfString") and protocols (SOAP).

Porting tool 150 first examines the WSDL of FIGS. 4A-4C to determine the set of operations specified for the web service (data portion 480), the input/output parameters specified for each operation (data portions 475 and 485), the data types of each parameter (data portions such as 420, 425, 452, 454), etc. Porting tool 150 then identifies the source definitions mapped by the source framework (170) to the determined set of operations as described below with examples.

5. Identifying Source Mapping

Continuing now with respect to FIG. 3, parser 350 (contained in porting tool 150) receives service application 180 (implemented according to interface 160) and WSDL 310 as inputs and then identifies the source definitions mapped to the set of operations specified in the WSDL by inspecting service application 180. Parser 350 may either inspect the source code of service application 180 using parsing techniques or a compiled/executable form of service application 180 using techniques such as reflection to generate source mapping 360.

It is noted that service application 180 typically contains instructions/data (commonly referred to as annotations in Java programming environments) associated with each source implementation/definition. The annotations specify the name of the operation implemented by the corresponding source implementation. Parser 350 can uses techniques such as reflection (when the source code is not present) to retrieve and inspect the annotations for each source implementation in service application 180, to accordingly generate source mapping 360.

Source mapping 360 represents a set of mappings between source definitions and corresponding operations specified in WSDL 310 for service 130. Source mapping 360 may include mappings between the data types specified in the source definitions and those specified in WSDL 310. In one embodiment, source mapping 360 is specified according to XML as described below with examples.

FIGS. 5A-5B depicts portions of a source mapping specifying the procedure definitions to which a source framework (170) maps the operations of a web service (130) specified according to the contract (WSDL 310) in one embodiment. Data portion 510 indicates that the mapping is from the operations specified in the WSDL to procedure definitions provided according to Java programming language.

Data portion 530 specifies a mapping between a data type "Employee" specified in the WSDL and a corresponding type "test.sei.generated.Employee" (a Java class) in the source definitions. In other words, data portion 530 indicates that the source framework (170) defines a class/type named "Employee" for the "Employee" data type specified in the WSDL (data portion 440). Similarly, data portion 540 indicates that the "ArrayOfDateTime" data type specified in WSDL 310 (data portion 430) is mapped to the java type "java.util.Calendar[ ]" in the source definitions.

Data portion 560 specifies the mapping between the services/ports defined in the WSDL to the corresponding Java classes. In particular, data portion 560 indicates that the service specified in data portion 490 of WSDL 310 is implemented as a class having the same name as the service "test.sei.generated.ComplexDataTypesDocLitWService". Data portion 565 specifies the name of the class containing the source implementations in service application 180. It may be appreciated that the mappings of data portions 560 and 565 is generated based on the annotations associated with the corresponding classes/methods.

Data portion 570 specifies a mapping between an operation defined in the WSDL and a corresponding source definition, a method in the java class indicated by data portion 565. In particular, data portions 571 and 572 together indicates that the operation "RetArrayDateTime1D" defined in WSDL 310 is mapped by the source framework (170) to the source definition "retArrayDateTime1D". Such a mapping is generated based on the presence of the operation name "RetArrayDateTime1D" in the annotations retrieved for the method "retArrayDateTime1D".

Data portions 576 and 578 respectively specify the mappings between the input and output parameters specified for the operation in the WSDL and the corresponding parameters/return value of the method/source definition. The mappings could be generated based on the annotations retrieved for the parameters of the method "retArrayDateTime1D". Other operations specified in the WSDL may be mapped to corresponding methods similar to (and by repeating multiple times) data portion 570.

Thus, porting tool 150 generates source mapping 360 identifying the source definitions mapped by the source framework (170) to the operations specified in WSDL 310. Source mapping 360 may be stored in a memory (e.g. volatile memory such as RAM, non-volatile memory such as secondary storage) and later used when generating wrapper module 190.

6. Configuration Files

Referring again to FIG. 3, configuration files 330 specifies the details of the source and target frameworks. In one embodiment, configuration files 330 contain a source and a target file specified according to XML, as described below with examples.

FIG. 6A depicts portions of a source configuration file (part of 330) specifying the details of a source framework (170) in one embodiment. Data portion 610 specifies the location (on a secondary storage) of the source implementation (in the form of service application 180), while data portion 620 specifies the type of implementation as an EAR (Enterprise Archive) package. Data portion 630 specifies the name/type and version "OC4J1013" (OC4J 10.13) of the source framework (170).

Data portion 640 specifies the location of the source implementations within the service application, the location of the WSDL in the service application, and the location of the file containing the source mapping (360 shown in FIGS. 5A-5B). Data portion 650 specifies the details of the web service that is sought to be ported and the corresponding implementations in the service application.

FIG. 6B depicts portions of a target configuration file (part of 330) specifying the details of a target framework (175) in one embodiment. Data portion 660 specifies a type of implementation supported by the target framework (175) as a WAR (web application archive) package. Data portion 670 specifies the name/type and version "WLS103RPC" (Weblogic 10.3) of the target framework (175), while data portion 675 specifies the home location of the framework.

Data portion 680 specifies the location at which the target implementations are to be generated, the location of the WSDL, and the location of the file containing the target mapping (380 described in detail below). Data portion 690 specifies the corresponding implementations in the service application to be generated for the web service (130) that is being ported to the target framework (175).

Porting tool 150 receives configuration files 330 and generates the source/target mappings based on the information provided in configuration files 330. For example, parser 350 in porting tool 150 may inspect the source configuration file of FIG. 6A to determine the location of the source implementations, the location of the WSDL, the specific web services for which the wrapper module is to be generated, etc.

After identifying the source mapping, porting tool 150 then determines the procedure definitions mapped by the target framework (175) to the operations, as described below with examples.

7. Determining Target Mapping

Referring again to FIG. 3, service endpoint interface (SEI) 340 represents the interface (165), defined by the target framework (175) for the web service (130) specified in WSDL 310. SEI 340 contains the target definitions according to which target implementations are to be created. Thus, SEI 340 represents the interface that every service application needs to implement to operate with the target framework (175).

In one embodiment, porting tool 150 generates SEI 340 by invoking a tool provided by the target framework (175) with the contract (WSDL 310) of the web service (130). For example, for the Weblogic target stack, porting tool 150 invokes a proxy generator tool such as WebServiceAssembler tool available from Oracle Corporation for generating SEI 340. The target definitions generated for WSDL 310 for the target framework is described below with examples.

FIG. 7 depicts sample portions of a service endpoint interface (SEI) created for a WSDL file (shown in FIGS. 4A-4C) in one embodiment. For illustration and as noted above, the software code created for SEI is shown in terms of pseudo-code similar to Java™ language (available from Sun Microsystems), well known in the relevant arts.

Data portion 710 indicates the package name of the SEI, while data portion 715 specify the names of other packages (and classes) required for execution of the SEI. Data portion 720 specifies an interface named "ComplexDataTypes-DocLitWServiceSoap" representing the contractual service/ web service of the same name, and using a SOAP RPC binding for receiving/sending requests/responses.

Data portion 740 specifies a target definition corresponding to the operation "RetArrayString1D" specified in data portions 475/485 of WSDL 310. In particular, data portion 742 specifies the name of the method/target definition as "retArrayString1D" and the return value/output parameter type as "org.tempuri.ArrayOfString", while data portion 745 specifies the name and data type of an input parameter respectively as "inArrayString1D" and "org.tempuri.ArrayOfString". It may be observed that only a definition is include in SEI 340 as represented by the semi-colon at the end of the definition and by the keyword "interface" in data portion 720.

Similarly, data portion 760 specifies a method/target definition corresponding to the operation "RetArrayDateTime1D" specified in data portion 460 of WSDL 310. It may be observed that data portions 762 and 765 specify that the input/output data type is "org.tempuri.ArrayOfDateTime", which is different from the data type "java.util.Calendar[ ]" specified in the source definition for the same operation (as indicated by data portion 570 in source mapping 360). Only a few operations are shown in the Figure for illustration, though typically SEI 340 will contain the target definitions corresponding to all the operations specified in the WSDL.

Referring again to FIG. 3, parser 350 inspects SEI 340 to determine the target definitions mapped to the set of operations specified in the WSDL. Parser 350 may either inspect the source code of SEI 340 using parsing techniques or a compiled/executable form of SEI 340 using techniques such as reflection to generate target mapping 370.

Target mapping 370 represents a set of mappings between target definitions and corresponding operations specified in WSDL 310 for service 130. Target mapping 370 may include mappings between the data types specified in the target definitions and those specified in WSDL 310. However, the content of target mapping 370 is generally different (having different data type mappings) from the content of source mapping 360 due to the difference in implementation of the web service (defined by WSDL 310) by the different frameworks 170 and 175.

After determining the source and target definitions for each of the operations specified in the contract for the web service, porting tool 150 generates instructions based on the differences between the source and target definitions. Accordingly, porting tool 150 may compare the source definitions (in service application 180) and target definitions (in SEI 340) to identify the differences. In one embodiment, the differences are identified based on source mapping 360 and target mapping 370 and the instructions accordingly generated as described below with examples.

8. Generating Wrapper Module

Continuing with FIG. 3, code emitter 380 generates instructions based on the differences identified using source mapping 360 and target mapping 370. Code emitter 380, first identifies the difference between the corresponding source and target definitions for each operation specified in WSDL 310. For example, code emitter 380 may identify that the source and target definitions for the operation "RetArrayDateTime1D" (data portion 470 in WSDL 310) differs in the data types specified in the definitions ("org.tempuri.ArrayOfDateTime" data type in the target definition and "java.util.Calendar[ ]" data type in the source definition).

Code emitter 380 then generates instructions based on the identified differences. For example, if the difference is identified to be in the names of the procedures, code emitter 380 generates a target implementation for the corresponding target definition designed to invoke a source implementation (contained in service application 180) corresponding to the same operation contained in said service application. If a difference in data types is identified, code emitter 380 generates instructions in the implementation for converting between the different data types, thereby facilitating the target implementation to invoke the source implementation.

In one embodiment, the differences between the source and target definitions are identified by comparing the content of the tags contained in the source and target mappings. For example, the content of the tag "<java-method-name>" (shown in data portion 571) specified in the source mapping is compared with the content of the same tag specified in the target mapping for the same operation (having the same content for the tag "<wsdl-operation>" shown in data portion 572) to identify the difference in the names of the procedures. Similarly, the content of the tag "<param-type>" for each of the input parameters (shown in data portion 576) and the content of the tag "<method-return-value>" for the output parameter are compared to identify the differences in the data types of the parameters.

Wrapper code 390 represents the source code/instructions generated by porting tool 150 based on difference identified between the interfaces (160 and 165) of the different frameworks (170 and 175). The instructions are generated as part of the target implementations (for the corresponding target definitions) ready to be deployed on the target framework. Wrapper code 390 may be compiled (converted to executable form) and then deployed as wrapper module 190 along with service application 180 to facilitate the service application to operate with a different framework 175. Thus, a service application is facilitated to operate with different frameworks, though the service application is designed to operate with only one framework. Client application (115) may then access web service 130 on server system 145, as well.

Wrapper code 390 that may be generated based on the differences between source definitions (as shown FIGS. 5A-5B) and target definitions (as shown in FIG. 7) for the operations specified in the WSDL (of FIGS. 4A-4C) is described below with examples.

FIGS. 8A-8B together depicts portions of instructions (wrapper code 390) generated based on the difference identified between the interfaces of different frameworks in one embodiment. The instructions are shown generated in Java programming language for deployment on the Weblogic web service stack (target framework as indicated by data portion 670).

Data portion 810 specifies that the class "ComplexDataTypesDocLitWServiceSoapImpl" is an implementation of the endpoint interface specified in data portion 720 of SEI 340. Data portion 810 further specifies that the URI at which the web service is to be accessed. It may be observed that the name of the file "DocLitWService.asmx" and the context path form part of the URI specified in data portion 490 of WSDL 310.

Data portion 830 specifies a target implementation generated by code emitter 380 for the target definition shown in data portion 740 based on the difference (in data types) identified between the source and target definitions for the operation "RetArrayString1D". Accordingly, in data portion 832, the input parameter of data type "ArrayOfString" is converted to the data type "String[ ]" expected by the source implementation. In data portion 834, the source implementation is invoked and the result of invocation stored in the variable "_ret2BMigrated". In data portion 836, the result of invocation is converted from the data type "String[ ]" to the data type "ArrayOfString" specified in the target definition and in data portion 838 the converted result (stored in "_actualRet") is returned as the output/result of the procedure.

Similarly, data portions 850 and 870 specify target implementation generated by code emitter for the operations "RetArrayDateTime1D" and "RetStructSNSA" specified in data portions 470/480 of WSDL 310. It may be appreciated that data portions 852 and 856 are generated corresponding to the difference in the data types specified in the source definition ("java.util.Calendar[ ]" data type) and target definition ("org.tempuri.ArrayOfDateTime" data type) for the same operation "RetArrayDateTime1D".

Thus, code emitter 380 generates instructions (as part of the target implementations) based on the differences identified between the source and target definitions mapped to the operations specified for the web service. Code emitter 380 may generate target implementations for all the target definitions, with the target implementation for an operation having no difference in the definitions merely invoking the corresponding source implementation.

It may be observed that the target implementations generated contains several program statements/instructions (shown as respective portions of FIGS. 8A-8B). It is noted that the program statements are generated programmatically (as opposed to user having to manually specify/code the same). Accordingly, the time and resources required to make the service application operative with different frameworks is substantially reduced (in comparison to the manual approach described above with respect to FIG. 1).

It may be further observed in data portions 832, 836, 852 and 856 that the conversion between different data types is performed using a copy method of a copy utility class (which is also included as part of wrapper code 390). The copy utility class provided according to an aspect of the present invention facilitates the copying/conversion of different data types as described below with examples.

9. Copy Utility Module

FIG. 9A-9B depicts portions of a copy utility module that facilitates conversion of different data types in one embodiment. Though the instructions are shown in Java programming language, the copy utility module can be implemented in other programming languages as well.

Broadly, the copy utility module contains multiple methods/procedures, with each method/procedure designed to accept a specific data type as an input and to generate another data type as the result of invocation of the method. All the methods performing the conversions are named "copy", with the specific method to be invoked determined based on the data type of the input parameter.

Data portion 910 specifies the name of the class containing the copy utility methods. The name of the class is used to invoke the desired method, as shown in data portions 832, 836, 852 and 856. Data portion 920 specifies a method (invoked in data portion 856) which converts/copies from a "Calendar[ ]" data type (taken as input) to a "ArrayOfDateTime" data type (provided as the result).

Similarly, data portions 940, 960 and 980 specify other methods that convert from one data type to another, and which are invoked in wrapper code 390 (shown in FIGS. 8A and 8B) for performing the conversion between the different data types specified in the source and target definitions. It may be observed that in data portion 940, the conversion involves copying of the individual elements (such as BaseDetails, JobID, etc.) between the different data types, while in data portion 980, the conversion involves copying of individual elements from one array to another.

According to an aspect of the present invention, the instruction forming the copy utility module is generated based on the identification of the conversions (between data types) required for in wrapper module 190. The copy utility module is generated once and compiled (along with the instructions shown in FIGS. 8A-8B) as part of wrapper code 390. Such static integration of the copy utility module is in contrast to a run-time conversion approach where the analysis of the different data types and the corresponding conversions is performed only when processing a web service request (and accordingly is a costly operation since substantial portion of the analysis is repeated for each request).

Furthermore, it may be observed that only the copy methods that are used for conversion of data types are included as part of wrapper code 390, in contrast to the alternative approach where a pre-defined set of copy methods are provided as a stand-alone module (as a jar/DLL file) which necessitates the module to be dynamically linked/invoked for each web service request.

It should be further appreciated that the features described above can be implemented in various embodiments as a desired combination of one or more of hardware, executable modules, and firmware. The description is continued with respect to an embodiment in which various features are operative when the software instructions described above are executed.

10. Digital Processing System

Figure 10:
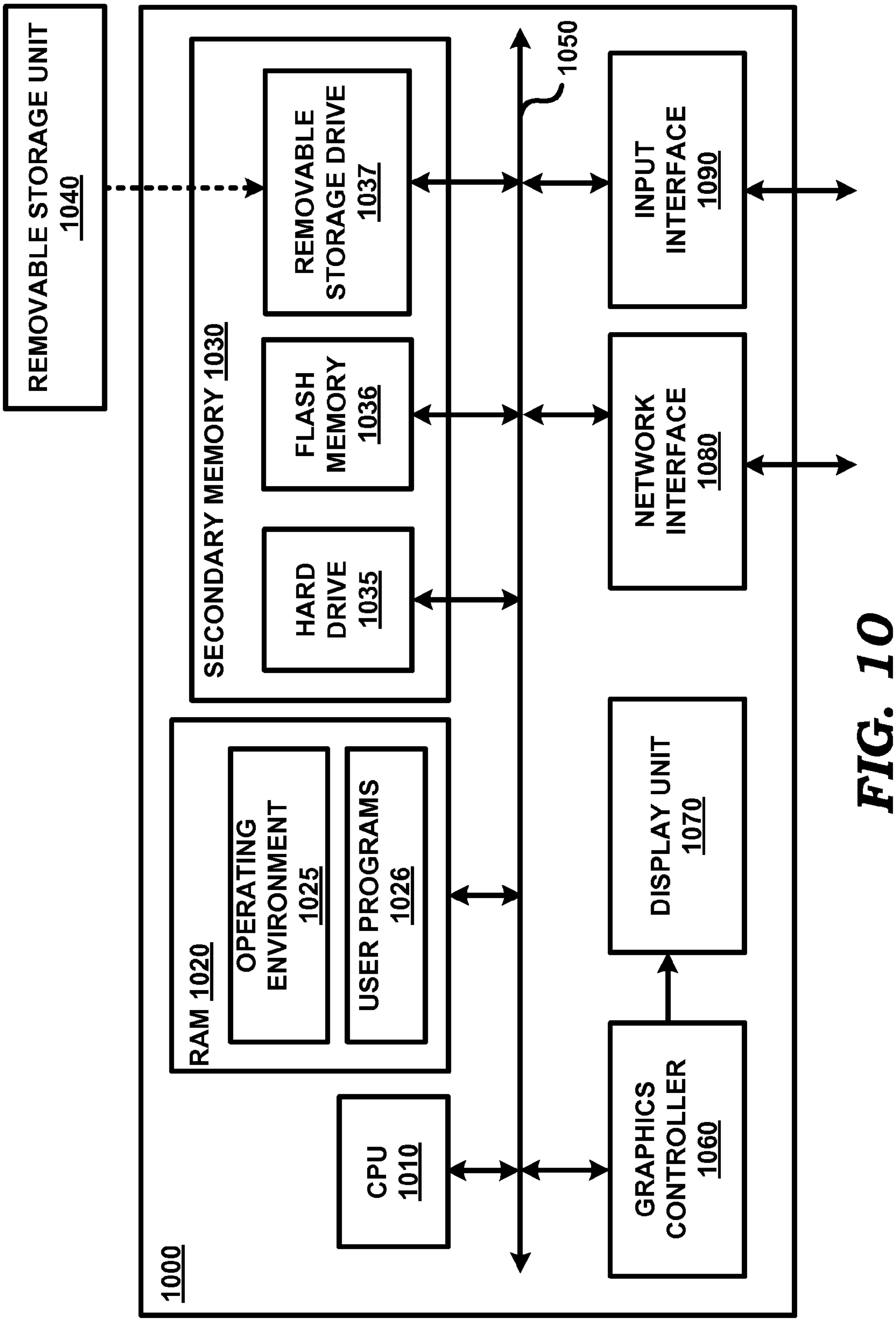
FIG. 10 is a block diagram illustrating the details of a digital processing system in which various aspects of the present invention are operative by execution of appropriate executable modules.

FIG. 10 is a block diagram illustrating the details of digital processing system 1000 in which various aspects of the present invention are operative by execution of appropriate executable modules. Digital processing system 1000 may correspond to server system 145.

Digital processing system 1000 may contain one or more processors such as a central processing unit (CPU) 1010, random access memory (RAM) 1020, secondary memory 1030, graphics controller 1060, display unit 1070, network interface 1080, and input interface 1090. All the components except display unit 1070 may communicate with each other over communication path 1050, which may contain several buses as is well known in the relevant arts. The components of FIG. 10 are described below in further detail.

CPU 1010 may execute instructions stored in RAM 1020 to provide several features of the present invention. CPU 1010 may contain multiple processing units, with each processing unit potentially being designed for a specific task. Alternatively, CPU 1010 may contain only a single general-purpose processing unit.

RAM 1020 may receive instructions from secondary memory 1030 using communication path 1050. RAM 1020 is shown currently containing software instructions constituting operating system 1025 and/or other code/programs 1026 (such as client applications, Web browser, application instances processing user requests, load balancer/management applications, RDBMS, etc.). In addition to operating system 1025, RAM 1020 may contain other software programs such as device drivers, virtual machines, etc., which provide a (common) run time environment for execution of other code/programs.

Graphics controller 1060 generates display signals (e.g., in RGB format) to display unit 1070 based on data/instructions received from CPU 1010. Display unit 1070 contains a display screen to display the images defined by the display signals. Input interface 1090 may correspond to a keyboard and a pointing device (e.g., touch-pad, mouse) and may be used to provide inputs. Network interface 1080 provides connectivity to a network (e.g., using Internet Protocol), and may be used to communicate with other systems of FIG. 1 such as client system 100.

Secondary memory 1030 may contain hard drive 1035, flash memory 1036, and removable storage drive 1037. Secondary memory 1030 may store the data (for example, portions of WSDL 310, configuration files 330, source mapping 360, target mapping 370) and software instructions (for example, portions of service application 180, wrapper module 190, SEI 340, wrapper code 390 in source and/or compiled form), which enable digital processing system 1000 to provide several features in accordance with the present invention.

Some or all of the data and instructions may be provided on removable storage unit 1040, and the data and instructions may be read and provided by removable storage drive 1037 to CPU 1010. Floppy drive, magnetic tape drive, CD-ROM drive, DVD Drive, Flash memory, removable memory chip (PCMCIA Card, EPROM) are examples of such removable storage drive 1037.

Removable storage unit 1040 may be implemented using medium and storage format compatible with removable storage drive 1037 such that removable storage drive 1037 can read the data and instructions. Thus, removable storage unit 1040 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1040 or hard disk installed in hard drive 1035. These computer program products are means for providing software to digital processing system 1000. CPU 1010 may retrieve the software instructions, and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

11. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of facilitating a service application to operate with different service frameworks executing in application servers, wherein said service application is designed to operate with a first service framework in providing a web service according to a contract, said method being performed in an application server, said method comprising:

identifying that said first service framework is designed to operate with service applications according to a first interface for said web service, wherein said service application is implemented according to said first interface;

determining that a second service framework executing in said application server is designed to operate with service applications according to a second interface for said web service, said second interface being different from said first interface;

examining said contract to identify a set of operations defined in said contract for said web service, wherein said first interface comprises a first set of procedure definitions, wherein each of said first set of procedure definitions needs to be implemented for interfacing with said first service framework for a corresponding one of said set of operations, wherein said service application implements said first set of procedure definitions, wherein said second interface comprises a second set of procedure definitions, wherein each of said second set of procedure definitions needs to be implemented for interfacing with said second service framework for a corresponding one of said set of operations, wherein said set of differences comprises differences between a corresponding one of said first set of procedure definitions and a corresponding one of said second set of procedure definitions for each of said set of operations;

generating a wrapper module based on said set of differences identified between said first interface and said second interface; and deploying said wrapper module and said service application in said application server, whereby said service application operates with said second service framework to provide said web service according to said contract in said application server.

2. The method of claim 1, wherein said identifying said first interface is performed by inspecting instructions constituting said service application, wherein said determining said second interface is performed by invoking a tool provided as part of said second service framework with said contract to generate said second interface.

3. The method of claim 1, further comprising:

creating a first plurality of mappings after said identifying, wherein each of said first plurality of mappings identifies a corresponding one of said first set of procedure definitions for each of said set of operations defined in said contract for said web service;

creating a second plurality of mappings after said determining said second interface, wherein each of said second plurality of mappings identifies a corresponding one of said second set of procedure definitions for each of said set of operations; and storing said first plurality of mappings and said second plurality of mappings in a memory, wherein said generating identifies said set of differences based on said first plurality of mappings and said second plurality of mappings stored in said memory.

4. The method of claim 3, wherein said memory is a non-volatile memory, said method further comprising:

receiving an indication that said service application is to operate with a third service framework executing in said application server, said third service framework designed to operate with service applications according to a third interface for said web service; and generating a second wrapper module based on a second set of differences identified between said third interface and said first plurality of mappings retrieved from said non-volatile memory, wherein said deploying deploys said second wrapper module and said service application in said application server, whereby said service application operates with said third service framework to provide said web service according to said contract in said application server.

5. The method of claim 1, wherein a first difference for a first operation is a difference in the name of a corresponding first procedure definition and a corresponding second procedure definition, wherein said generating generates a corresponding second implementation for said second procedure definition designed to invoke a first implementation of said first procedure definition contained in said service application, wherein said first difference is contained in said set of differences, said first operation is contained in said set of operations, said first procedure definition is contained in said first set of procedure definitions, and said second procedure definition is contained in said second set of procedure definitions.

6. The method of claim 5, wherein a second difference for said first operation is a difference in the data types, wherein said first procedure definition contains a first set of data types and said second procedure definition contains a second set of data types, wherein said generating generates said second implementation further designed to convert between said first set of data types and said second set of data types, thereby facilitating said second implementation to invoke said first implementation.

7. The method of claim 6, wherein said first set of data types contains a first object type and said second set of data types contains a second object type, wherein said generating generates a first copy method to convert from said first object type to said second object type, and a second copy method to convert from said second object type to said first object type, wherein said first copy method and said second copy are included in a copy utility module forming part of said wrapper module.

8. The method of claim 7, further comprising:

compiling said copy utility module along with said wrapper module, before said deploying, whereby said first copy method and said second copy method are merely invoked when processing each of a sequence of requests for said web service, without having to again identify said set of differences and regenerate said first copy method and said second copy method for each of said sequence of requests.

9. A computing system comprising:

a first application server to execute a first service framework and a service application, wherein said service application is designed to operate with said first service framework in providing a web service according to a contract, wherein said first service framework is designed to operate with service applications according to a first interface for said web service, said service application being implemented according to said first interface;

a second application server to execute a second service framework designed to operate with service applications according to a second interface for said web service, said second interface being different from said first interface; and a porting tool to generate a wrapper module based on a set of differences identified between said first interface and said second interface and to deploy said wrapper module and said service application in said second application server, whereby said service application operates with said second service framework to provide said web service according to said contract in said second application server, a client system to send a first request for invocation of said web service to said first service framework in said first application server and to send a second request for invocation of said web service to said second service framework in said second application server, wherein the formats of said first request and said second request are the same according to said contract, wherein at least one of said client system, first application server, said second application server and said porting tool is implemented by a processor executing instructions retrieved from a memory.

10. The computing system of claim 9, wherein said porting tool is operable to examine said contract to identify a set of operations defined in said contract for said web service, wherein said first interface comprises a first set of procedure definitions, wherein each of said first set of procedure definitions needs to be implemented for interfacing with said first service framework for a corresponding one of said set of operations, wherein said service application implements said first set of procedure definitions, wherein said second interface comprises a second set of procedure definitions, wherein each of said second set of procedure definitions needs to be implemented for interfacing with said second service framework for a corresponding one of said set of operations, wherein said set of differences comprises differences between a corresponding one of said first set of procedure definitions and a corresponding one of said second set of procedure definitions for each of said set of operations.

11. The computing system of claim 10, wherein said porting tool is operable to:

create a first plurality of mappings, wherein each of said first plurality of mappings identifies a corresponding one of said first set of procedure definitions for each of said set of operations defined in said contract for said web service;

create a second plurality of mappings, wherein each of said second plurality of mappings identifies a corresponding one of said second set of procedure definitions for each of said set of operations;

store said first plurality of mappings and said second plurality of mappings in a memory; and identify said set of differences based on said first plurality of mappings and said second plurality of mappings stored in said memory.

12. The computing system of claim 11, wherein said memory is a non-volatile memory, said porting tool further operable to:

receive an indication that said service application is to operate with a third service framework executing in a third application server, said third service framework designed to operate with service applications according to a third interface for said web service;

generate a second wrapper module based on a second set of differences identified between said third interface and said first plurality of mappings retrieved from said non-volatile memory; and deploy said second wrapper module and said service application in said third application server, whereby said service application operates with said third service framework to provide said web service according to said contract in said third application server.

13. The computing system of claim 10, wherein a first difference for a first operation is a difference in the name of a corresponding first procedure definition and a corresponding second procedure definition, wherein said porting tool generates a corresponding second implementation for said second procedure definition designed to invoke a first implementation of said first procedure definition contained in said service application, wherein said first difference is contained in said set of differences, said first operation is contained in said set of operations, said first procedure definition is contained in said first set of procedure definitions, and said second procedure definition is contained in said second set of procedure definitions.

14. The computing system of claim 13, wherein a second difference for said first operation is a difference in the data types, wherein said first procedure definition contains a first set of data types and said second procedure definition contains a second set of data types, wherein said porting tool generates said second implementation further designed to convert between said first set of data types and said second set of data types, thereby facilitating said second implementation to invoke said first implementation.

15. A system facilitating a service application to operate with different service frameworks, wherein said service application is designed to operate with a first service framework in providing a web service according to a contract, wherein said first service framework is designed to operate with service applications according to a first interface for said web service, said service application being implemented according to said first interface, said system comprising:

a processor;

a random access memory (RAM); and a machine readable medium to store a first set of instructions, a second set of instructions, and a third set of instructions, wherein said first set of instructions when retrieved into said RAM and executed by said processor form a second service framework designed to operate with service applications according to a second interface for said web service, said second interface being different from said first interface, said second set of instructions when retrieved into said RAM and executed by said processor form said service application, said third set of instructions when retrieved into said RAM and executed by said processor form a wrapper module designed to convert between said first interface and said second interface, thereby enabling said service application to operate with said second service framework to provide said web service according to said contract, a fourth set of instructions, wherein said fourth set of instructions when retrieved into said RAM and executed by said processor form a porting tool designed to generate said wrapper module based on a set of differences identified between said first interface and said second interface, said porting tool containing one or more instructions for examining said contract to identify a set of operations defined in said contract for said web service, wherein said first interface comprises a first set of procedure definitions, wherein each of said first set of procedure definitions needs to be implemented for interfacing with said first service framework for a corresponding one of said set of operations, wherein said service application implements said first set of procedure definitions, wherein said second interface comprises a second set of procedure definitions, wherein each of said second set of procedure definitions needs to be implemented for interfacing with said second service framework for a corresponding one of said set of operations, wherein said set of differences comprises differences between a corresponding one of said first set of procedure definitions and a corresponding one of said second set of procedure definitions for each of said set of operations.

16. The system of claim 15, wherein said porting tool contains one or more instructions for:

creating a first plurality of mappings, wherein each of said first plurality of mappings identifies a corresponding one of said first set of procedure definitions for each of said set of operations defined in said contract for said web service;

creating a second plurality of mappings, wherein each of said second plurality of mappings identifies a corresponding one of said second set of procedure definitions for each of said set of operations;

storing said first plurality of mappings and said second plurality of mappings in a memory; and identifying said set of differences based on said first plurality of mappings and said second plurality of mappings stored in said memory.

17. A non-transitory machine readable medium storing one or more sequences of instructions which when executed by one or more processors of a server system causes said server system to process requests invoking web services, said one or more sequences of instructions comprising:

a first set of instructions, when executed in said server system constituting a service application said service application is designed to operate with a first service framework in providing a web service according to a contract, wherein said first service framework is designed to operate according to a first interface for said web service, wherein said service application is implemented according to said first interface, said contract specifying a set of operations for said web service, wherein said first interface comprises a first set of procedure definitions, wherein each of said first set of procedure definitions needs to be implemented for interfacing with said first service framework for a corresponding one of said set of operations, wherein said service application implements said first set of procedure definitions;

a second set of instructions constituting a second service framework, wherein said second service framework is designed to operate with service applications according to a second interface for said web service, said second interface being different from said first interface, wherein said second interface comprises a second set of procedure definitions, wherein each of said second set of procedure definitions needs to be implemented for interfacing with said second service framework for a corresponding one of said set of operations; and a third set of instructions constituting a wrapper module generated based on a set of differences identified between said first interface and said second interface, wherein said set of differences comprises differences between a corresponding one of said first set of procedure definitions and a corresponding one of said second set of procedure definitions for each of said set of operations, wherein said second service framework receives a plurality of requests, each request specifying an operation of said set of operations for said web service according to said contract, each request being received from one of a client systems of a plurality of client systems, in response to receiving of each of said plurality of requests, said service framework being designed to perform invocations in accordance with said second set of procedure definitions, said wrapper module being designed to convert said invocations in accordance with said second set of procedure definitions to invocations in accordance with said first set of procedure definitions, whereby said service application operates with said second service framework to provide said web service according to said contract in said application server.

18. The machine readable medium of claim 17, wherein a first difference for a first operation is a difference in the name of a corresponding first procedure definition and a corresponding second procedure definition, wherein said generating generates a corresponding second implementation for said second procedure definition designed to invoke a first implementation of said first procedure definition contained in said service application, wherein said first difference is contained in said set of differences, said first operation is contained in said set of operations, said first procedure definition is contained in said first set of procedure definitions, and said second procedure definition is contained in said second set of procedure definitions.

19. The machine readable medium of claim 17, wherein a second difference for said first operation is a difference in the data types, wherein said first procedure definition contains a first set of data types and said second procedure definition contains a second set of data types, wherein said generating generates said second implementation further designed to convert between said first set of data types and said second set of data types, thereby facilitating said second implementation to invoke said first implementation.

* * * * *

UNITED STATES PATENT AND TRADEMARK OFFICE

CERTIFICATE OF CORRECTION

PATENT NO. : 8,626,825 B2
APPLICATION NO. : 12/717946
DATED : January 7, 2014
INVENTOR(S) : Subramanian et al.

It is certified that error appears in the above-identified patent and that said Letters Patent is hereby corrected as shown below:

In the Drawings

On sheet 2 of 16, in figure 2, under reference numeral 230, line 1, delete “defintions” and insert -- definitions --, therefor.

On sheet 2 of 16, in figure 2, under reference numeral 250, line 1, delete “defintions” and insert -- definitions --, therefor.

On sheet 3 of 16, in figure 3, under reference numeral 330, line 1, delete “cofiguration” and insert -- configuration --, therefor.

In the Claims

In column 17, line 60, in Claim 7, delete “copy are” and insert -- copy method are --, therefor.

Signed and Sealed this
Fifteenth Day of July, 2014

*Michelle K. Lee*

Michelle K. Lee
*Deputy Director of the United States Patent and Trademark Office*